E. H. WARBASSE.
Wheeled Hoes.
No. 149,083.                Patented March 31, 1874.
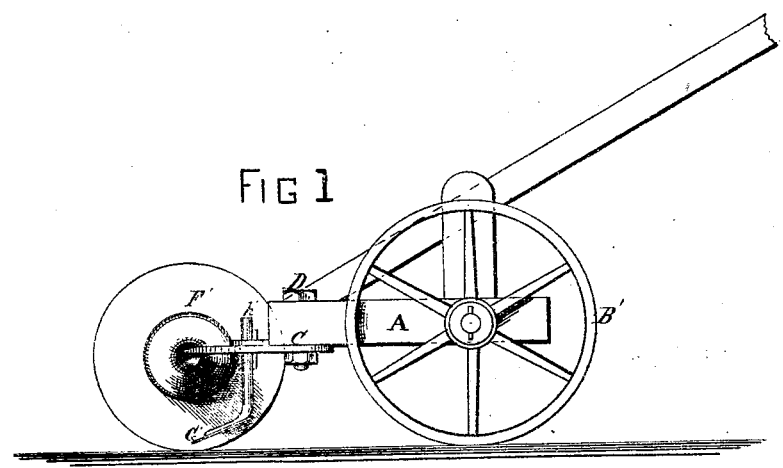
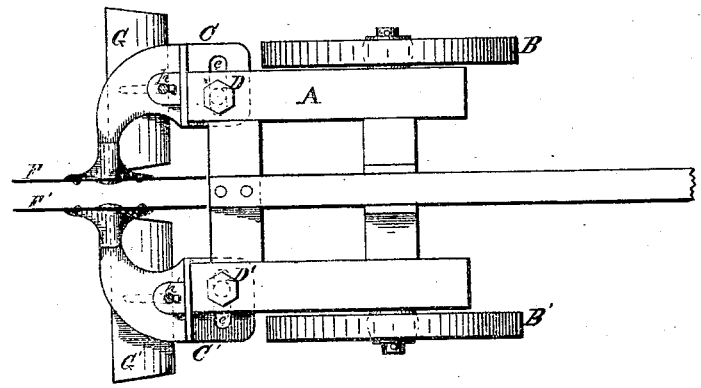
WITNESSES.                    INVENTOR.

UNITED STATES PATENT OFFICE.

ELIAS H. WARBASSE, OF PHILADELPHIA, PENNSYLVANIA.

IMPROVEMENT IN WHEELED HOES.

Specification forming part of Letters Patent No. 149,083, dated March 31, 1874; application filed December 31, 1873.

*To all whom it may concern:*

Be it known that I, ELIAS H. WARBASSE, of the city and county of Philadelphia, State of Pennsylvania, have invented an Improvement in Wheeled Hoes, of which the following is a specification:

My invention consists in attaching to the frame-work of a wheeled hoe two adjustable curved arms, each of which supports a revolving disk and a hoe-blade, the revolving disks being so arranged and adjusted any distance apart as to stride the rows or drills and prevent the hoes from covering the plants while cultivating the earth and removing the weeds from the furrows.

Figure 1 is a side elevation of a wheeled hoe embodying my improvement. Fig. 2 is a plan view of the same.

The frame A of the machine is mounted on wheels B and B', and is provided at one end with two curved arms, C and C'. These arms are made with their inner ends of increased width, and are attached to the frame A by means of screw-bolts D and D', which pass through transverse slots e and e' to permit a lateral adjustment of them. The portion of the arms C and C' which project beyond the end of the frame A have hoes G and G' attached, and the extremities which curve toward each other are provided with journals, which support two revolving disks, F and F'. The said disks, when adjusted to stride the row or drill, will shield the plants from the earth thrown up by the action of the hoes. The hoes G and G' are suspended from the arms by means of rods h and h', which are adjusted vertically either by set-screws or keys, and the disks F and F' are adjusted any required distance apart by slacking the nuts on the bolts D and D', and moving the arms laterally inward or outward.

In operating the machine, the handle or handles are fixed so as to lead to the back or rear of the wheels, as shown in the drawings; in this case the disks and hoes are at the front end of the machine, the fulcrum (the axle and wheels) being between the power and weight; but if it is desired to regulate the dip of the hoes, the handle or handles are reversed so as to bring the weight between the power and the fulcrum; this will also necessitate the reversing of the hoes. The machine may be regulated so as to work in between the rows of plants by removing the disks entirely from the arms, and reversing the arms from one side to the other of the machine, which operation will permit the hoes to be separated a short distance apart or drawn close together, so as to form one hoe occupying the entire width of the furrow between the drills.

What I claim as my invention is—

In a wheeled hoe the combination of the curved slotted arms C C', hoes G G', revolving disks F F', and bolts D D', substantially as herein shown and described.

ELIAS H. WARBASSE.

Witnesses:
 ISAAC R. OAKFORD,
 EDWD. SWAIN.